US006843181B2

(12) United States Patent
Morris

(10) Patent No.: US 6,843,181 B2
(45) Date of Patent: Jan. 18, 2005

(54) DUCTING ASSOCIATED WITH RAIL TRACK AND INSTALLING APPARATUS

(76) Inventor: Jonathan Mark Morris, PO Box 38563, SW1V 3XE London (IE)

( * ) Notice: Subject to any disclaimer, the term of this patent is extended or adjusted under 35 U.S.C. 154(b) by 0 days.

(21) Appl. No.: 10/381,308

(22) PCT Filed: Sep. 24, 2001

(86) PCT No.: PCT/AU01/01200

§ 371 (c)(1),
(2), (4) Date: Mar. 24, 2003

(87) PCT Pub. No.: WO02/27882

PCT Pub. Date: Apr. 4, 2002

(65) Prior Publication Data

US 2003/0183117 A1 Oct. 2, 2003

(30) Foreign Application Priority Data

| Sep. 26, 2000 | (AU) | ............................................... | PR0352 |
| Jan. 8, 2001 | (AU) | ............................................... | PR2424 |
| Apr. 27, 2001 | (AU) | ............................................... | PR4639 |
| Jun. 26, 2001 | (AU) | ............................................... | PR5918 |

(51) Int. Cl.$^7$ ............................................... H02G 9/00
(52) U.S. Cl. ............................... 104/275; 238/2; 238/8; 174/68.1
(58) Field of Search ............................... 238/1, 2, 3, 4, 238/5, 6, 7, 8, 9

(56) References Cited

U.S. PATENT DOCUMENTS 5,660,112 A    8/1997    Theurer

FOREIGN PATENT DOCUMENTS

| DE | 19712775 | 10/1998 |
| EP | 0037615 | 8/1985 |
| EP | 0772271 | 5/1997 |
| FR | 2383539 | 10/1978 |
| GB | 2314903 | 1/1998 |
| JP | 04-304110 | 10/1992 |
| JP | 4-330103 | * 11/1992 |
| JP | 6-173214 | * 6/1994 |

* cited by examiner

Primary Examiner—Mark T. Le
(74) Attorney, Agent, or Firm—Jeffery M. Kaden; Gottlieb, Rackman & Reisman, P.C.

(57) ABSTRACT

Ducting associated with rail track comprising a bed (13) located along at least a portion of the length of the rail track, the bed lying proximate the rails (11), a resiliently deformable cover (27) receivable over the bed and comprising a plurality of elongated channel members located in an end to end relationship having their flanges (29) extending downwardly and outwardly, the cover being intended to cooperate with the bed to define a duct able to accommodate conductors, optical fibres, cable and services. The bed has retention means (21) in the form a groove to receive and retain the lips (31) of the channel members. An apparatus having a carriage (73) is movable along the rail track to cause inward resilient deformation of the cover by pairs of rollers (71) to enable installation and withdrawal of the lips (31) from the grooves (21).

54 Claims, 16 Drawing Sheets

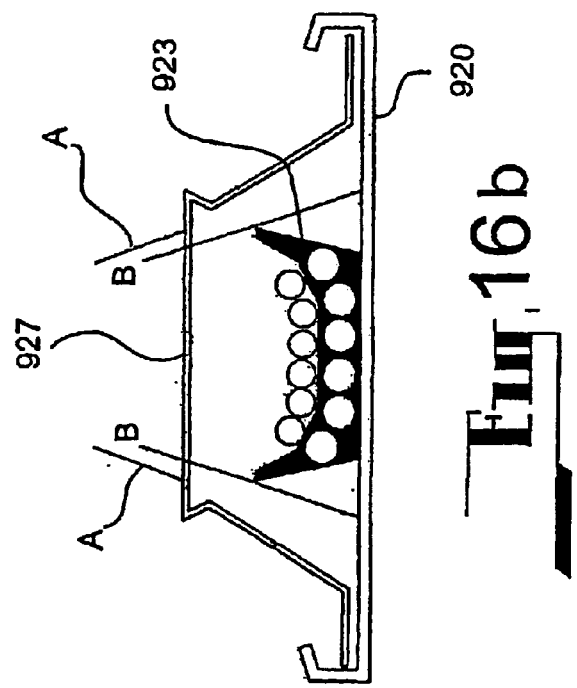
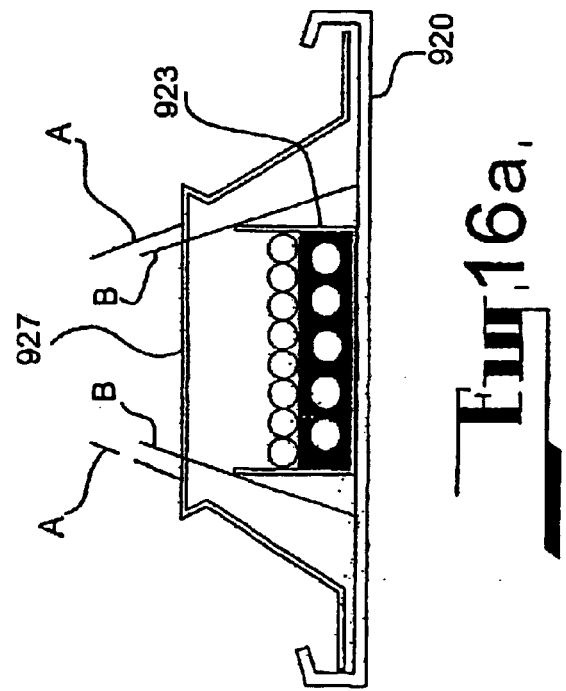

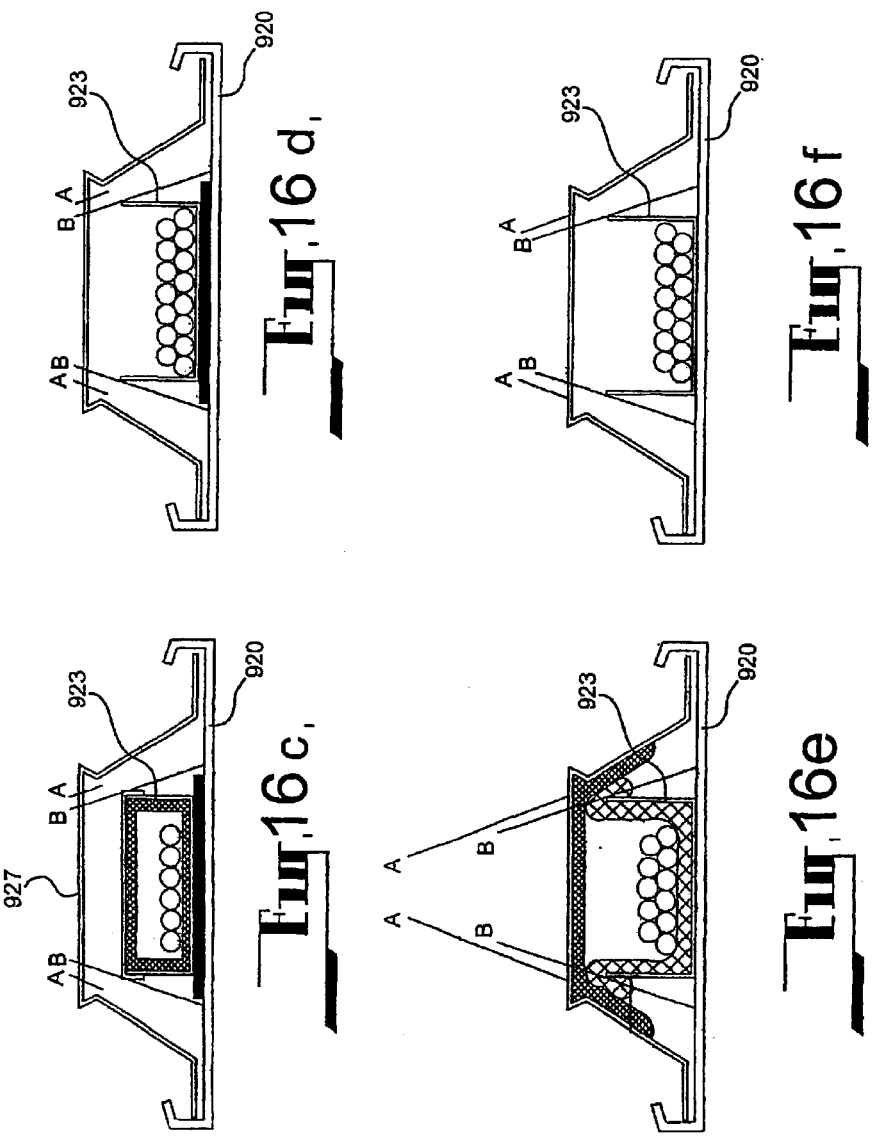

DUCTING ASSOCIATED WITH RAIL TRACK AND INSTALLING APPARATUS

FIELD OF THE INVENTION

This invention relates to service ducting associated with rail track which can be utilised to accommodate services such as telecommunications cable, optic fibre, power cables, conduits and the like.

Throughout the specification the term "conductors and the like" shall be taken as including electrical wires, cables and the like which are used for the transmission of signals and electricity, optic fibre communications cable, fluid conduits and like services.

Throughout the specification the term "sleepers" shall be taken as including sleepers, railway ties or any like any form of support which is used to support a rail track and which are located at spaced intervals along the track in providing that support

BACKGROUND ART

With the growth of communities and the increase in demand on utilities resulting from such growth together with the demand created by advances in technology, there is an increased requirement to provide additional conductors and the like for purposes of meeting the demand for telecommunication, provision of power and other services in areas which are already built up. As a result, significant infrastructure must be put in place in order to accommodate for the increased demand and in accommodating for the increased demand there can be a significant disruption to existing infrastructure and communities to accommodate existing installations for the additional infrastructure. In built-up areas, this can be particularly difficult as it involves significant disruption. In situations where the appropriate duct-work already exists, the introduction of additional cables also can be particularly disruptive. Even in cases where the existing duct-work enables the introduction of additional cables by "threading' them through the duct-work the action of "threading" any additional cables into the existing duct-work is time-consuming and labour-intensive. In addition, expanding the additional services to remote locations and to accommodate for the geographic expansion of communities involves considerable cost in laying the cable over fresh ground.

In most communities, a form of railway system exists, whether it be a heavy-duty railway for the transportation of heavy commuter traffic and/or freight or alternatively light rail. Existence of such railways provides the opportunity of associating the required communications ducting with the rail track.

It has been conventional practice to provide ducting for conductors and the like in association with rail track by locating such ducting underground and adjacent to the rail track. This has involved a dual use of the railway land but otherwise presents few savings since the construction and servicing of the rail track forms a totally separate function from the construction and servicing of the ducting. In addition railway authorities have been generally resistant to the dual use of land associated with rail track due to the possibility of damage to the structural integrity of the rail track foundation and disruption to the services provided by the railway. In addition, there have been proposals for providing some duct-work in direct association with a rail track for the purposes of accommodating conductors and telecommunications linkages which are associated with the running of the railway where such duct-work forms a part of the railway structure. Examples of such proposals which have been proposed for railway systems or other track systems are disclosed in AU-A-31645/95, U.S. Pat. No. 5,163,614, U.S. Pat. No. 5,823,114, FR2285491, DE401103, DE19712775, JP4304110 and JP6284542. None of the aforementioned proposals however provide systems whereby additional conductors and the like can be readily introduced into the associated duct-work to improve the carrying capacity.

A difficulty that exists in associating a service such as cabling duct-work with a rail track relates to the need to be able to service such duct-work without causing undue disruption of a railway service associated with the railway track. A further difficulty relates to providing such duct-work with the rail track without the likelihood of adversely affecting the structural integrity of the rail track. It is desirable that if ducting for the purpose of accommodating conductors and the like is associated with rail track such service does not significantly disrupt the operation of the railway associated with the railway track.

The preceding discussion of the background to the invention is intended only to facilitate an understanding of the present invention. It should be appreciated that the discussion is not an acknowledgement or admission that any of the material referred to was part of the common general knowledge in Australia as at the priority date of the application.

DISCLOSURE OF THE INVENTION

Accordingly, the invention resides in ducting associated with a railroad rail track, said railroad track comprising a pair of parallel rails supported from a base, the base providing a bed proximate the rails and co-extensive with the rail track, a cover receivable over the bed comprising a plurality of elongate channel members located in end to end relationship having their flanges extending downwardly, said cover being intended to cooperate with the bed to define a duct which is able to accommodate the conductors and the like, retention means associated with the bed and adapted to receive and retain the edges of the channel members, said edges being selectively disengageable and/or engagable with the retention means by application of opposed and inwardly directed forces to the edges to cause resilient inward displacement of the edges from the retention means.

According to a further preferred feature of the invention, adjacent lengths of said channel members are interconnected by sleeves which extend between the abutting ends of adjacent channel members.

According to a preferred feature of the invention the edges are at least partially retained by the retention means by a resilient deformation induced by engagement with the retention means.

According to a further preferred feature of the invention the ducting further comprises a support for conductors and the like which extends along the length of the bed. According to a preferred feature the support provides electrical and at least some vibrational insulation. According to a preferred feature of the invention the support is supported from the bed. According to a further preferred feature of the invention, the support comprises a plurality of cradles located at spaced intervals along the bed, said cradles having a recessed upper surface which is adapted to accommodate conductors and the like. According to a preferred feature of the invention, the rail track incorporates sleepers which support the rails and which are located at regular spaced intervals along the length of track, said bed being defined in part by a transverse zone of the upper surface of the sleepers and wherein the transverse zone accommodates the support. According to a further preferred feature, the transverse zone of the sleepers is recessed.

According to a further preferred feature of the invention, the support comprises a tray extending along the bed and defined by a plurality of interconnected elongate, upwardly directed channel members supported in end-to-end relationship. According to a further preferred feature of the invention, the flanges provided on the tray comprise the retention means. According to one embodiment, the flanges are inclined to be convergent towards each other, said flanges being adapted to receive between themselves the edges of the cover. According to a further preferred feature of the invention, the base of each of the tray accommodates the support which comprises an elongate support element adapted to receive the conductors and the like. According to a preferred feature of the invention, at least some of the conductors or the like are embedded within the support. According to a further feature of the embodiment, the surface of the support element is of a recessed cross-sectional profile. According to a preferred feature of the invention the recesses provided in the support are adapted to support the conductors in a one to one relationship. According to a preferred feature of the invention the recesses are spaced vertically with respect to each other. According to an alternative feature of the embodiment, the support is associated with a closure which is intended to be received over the support to isolate the conductors or the like from the remainder of the duct. According to a further preferred feature of the invention, the cover is adapted to cooperate with the support to enclose the conductors and the like accommodated by the support.

According to preferred feature of the invention the support is supported from the cover and is formed with at least one recess which is adapted to support the conductor. According to one embodiment the support and cover are integral and the recess is formed on the inner face of the cover. According to a preferred feature of the invention the recess is substantially closed and is provided with an entry which is normally closed and can be opened on deformation of the support.

According to a further preferred feature of the invention, the retention means comprises a pair of retention members supported from the bed at spaced intervals there along, the retention members of each pair being spaced to either side of the bed, the edges of the cover being received between the retention members. According to one embodiment, the rail track incorporates sleepers which support the rails and which are located at regular spaced intervals along the length of track, said bed being defined in part by a transverse zone of the upper surface of the sleepers, intermediate of the rails and wherein the sleeper is formed with a channel-shaped depression extending transversely across the upper surface of the sleeper, said retention members being incorporated to either side of the depression. According to an alternative embodiment, the retention means comprises an elongate member adapted to be fixed to the sleeper to extend across the bed, each end of the elongate member provided with said retention members. According to a further embodiment the retention means is fixed by at least one clip member which is clampingly engaged with the sleeper. According to one feature of the embodiment at least two clip members fix the retention means to the sleeper.

According to a further preferred feature of the invention, the flanges of the cover are inclined divergently with respect to each other. According to one embodiment the outer edge of each of the flanges is provided with a laterally extending lip which in use is to be retained between the retention members of the retention means and against the upper surface of the bed. According to a preferred feature of the invention the lips are directed outwardly from the cover. According to an alternative feature of the invention the lips are directed inwardly from the cover. According to a preferred feature of the invention the junction of the flanges with the remainder of the cover is adapted to enable resilient flexing of the flanges as a result of said resilient deformation.

According to a preferred feature of the invention the inner face of at least one of the flanges of the cover is formed with an inwardly directed extension which provides a support surface for the conductors. According to a preferred feature of the invention an extension is provided on each of the flanges. According to a preferred feature of the invention the extensions overlap, said extensions being resiliently deformable to enable separation between the overlapping portions. According to an alternative form of the invention the inner face of the cover is provided with a partition which subdivides the space defined within the cover by the extensions into separate spaces. According to one embodiment the free edges of the extensions abut with the partition and the extensions are capable of resilient deformation to separate their edges from the partition.

According to a preferred feature of the invention the bed is located between the rails.

According to a preferred feature of the invention the bed is located beside one of the rails. According to one embodiment the bed is located beside one of the rails and to the side of the rail remote from the other rail.

Accordingly the invention resides in an apparatus for enabling access to the ducting associated with a rail track as described above, said apparatus comprising an engaging means for causing resilient deformation of the cover to effect installation and/or withdrawal of the cover from engagement with the bed, said engaging means comprising a pair of opposed bearing members adapted to be engaged with opposed flanges of the cover, a drive means adapted to cause relative lateral movement of the bearing members with respect to each other and a motive means adapted to cause longitudinal movement of the bearing members along the cover. According to a preferred feature of the invention, the bearing members each comprise a roller, the outer surface of which is configured to engage the respective flange of the cover.

According to a preferred feature of the invention the engaging means comprises a clamping means. According to an alternative preferred feature of the invention the engaging means comprises a separating means.

According to a preferred feature of the invention the drive means comprises a plurality of axially spaced pairs of bearing members.

According to a further preferred feature of the invention, the apparatus is adapted to be supported from rails of the rail track to enable controlled movement of the means along the rail track. According to a further preferred feature a lift means is associated with the drive means for effecting controlled upward and downward movement of one end of the drive means relative to the other end. According to a preferred feature of the invention the apparatus further comprises an extraction means which is adapted to engage the conductor and extract or insert the conductors from or into duct on separation of the cover from the bed.

The invention will be more fully understood in the light of the following description of several specific embodiments.

BRIEF DESCRIPTION OF THE DRAWINGS

The description is made with reference to the accompanying drawings of which:

FIGS. 16a to 16f are cross-sectional views of alternative forms of the ducting according to further embodiments of the invention;

DETAILED DESCRIPTION OF SPECIFIC EMBODIMENTS

Each of the embodiments of the invention are directed to means for providing ducting association with a rail track whereby the ducting is able to accommodate conductors and the like without interruption or disruption of the railway service associated with the rail track and which can be serviced with a minimum of disruption to the railway services associated with the rail track.

Figure 1:
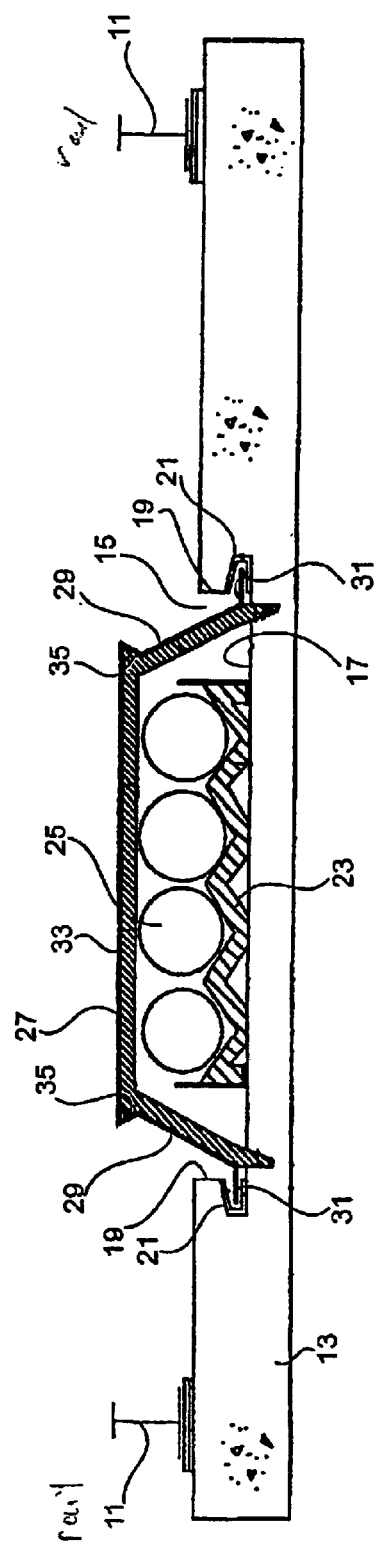
FIG. 1 is a schematic cross-sectional elevation of a first embodiment of the invention.

The first embodiment as illustrated at FIG. 1 comprises ducting which is associated with a rail track comprising a pair of parallel rails 11 supported on a set of regularly spaced sleepers 13. Each of the sleepers is formed with a central transversely extending recess 15 which defines a base 17 and outer edges 19 where each outer edge is formed with a laterally-extending groove 21. Each of the grooves 21 are lined with a chip and abrasion-resistant material such as metal or the like. The recesses 15 of sleepers of the rail track jointly define between themselves a bed which is intended to accommodate conductors and the like. The bed is further defined by a support 23 supported on the base 17 of each recess 15 of each sleeper where the support is formed of an electrical-insulating material which is also capable of providing at least some vibrational insulation. The upper surface of the support is of an undulating configuration to provide a plurality of transversely-directed grooves which are intended to receive and accommodate the conductors and the like 25.

The bed which is associated with a cover 27 which comprises a plurality of elongate lengths of channel which can be connected in end-to-end relationship to provide a continuous cover over the bed defined by the recesses 15 of the sleepers 13 of the rail track. The flanges of the channel are divergent with respect to each other and are provided at their outer edge with an outwardly-directed lip 31. The cover has dimensions such that in its relaxed state the lips 31 will be received in the lateral grooves 21 provided at the outer edges of each recess 15 when the cover 25 is in position. The configuration of the junction between each of the flanges 29 and the web 33 of the cover 25 is configured to provide a restraint against lateral forces which may be generated parallel to the axis of the rollers of the apparatus used to apply and remove the cover which will be described in greater detail below. This is effected by forming the inner end of each of the flanges 29 with a convergent portion 35 to provide a line of discontinuity along the width of the flange throughout which the remainder of the outer portion of the flange 29 can flex on application of an appropriate compressive force to the opposed the flanges 29 of the cover.

In order to install the cover 27 in position over the bed, the flanges 29 of the cover are inwardly compressed such that the spacing between the outer edges of the lips 31 is less than the spacing between the outer edges 19 of the recess 15. This will then allow the cover to be introduced into the recess 15 and on withdrawal of the compression forces between flanges 29, the lips 31 will be capable of entering the lateral grooves 21 provided in the outer edges 19 of the recesses 15.

As a result of the embodiment, a duct is provided between the cover 25 and the sleepers 13 of a rail track which is able to accommodate a set of conductors or the like. In the event that the cables accommodated by the duct require servicing, the cover is readily removed to provide such access to the conductors and the like. In addition, additional cables and services can be introduced into the duct relatively easily without the necessity to thread the additional cables into the duct.

Figure 2:
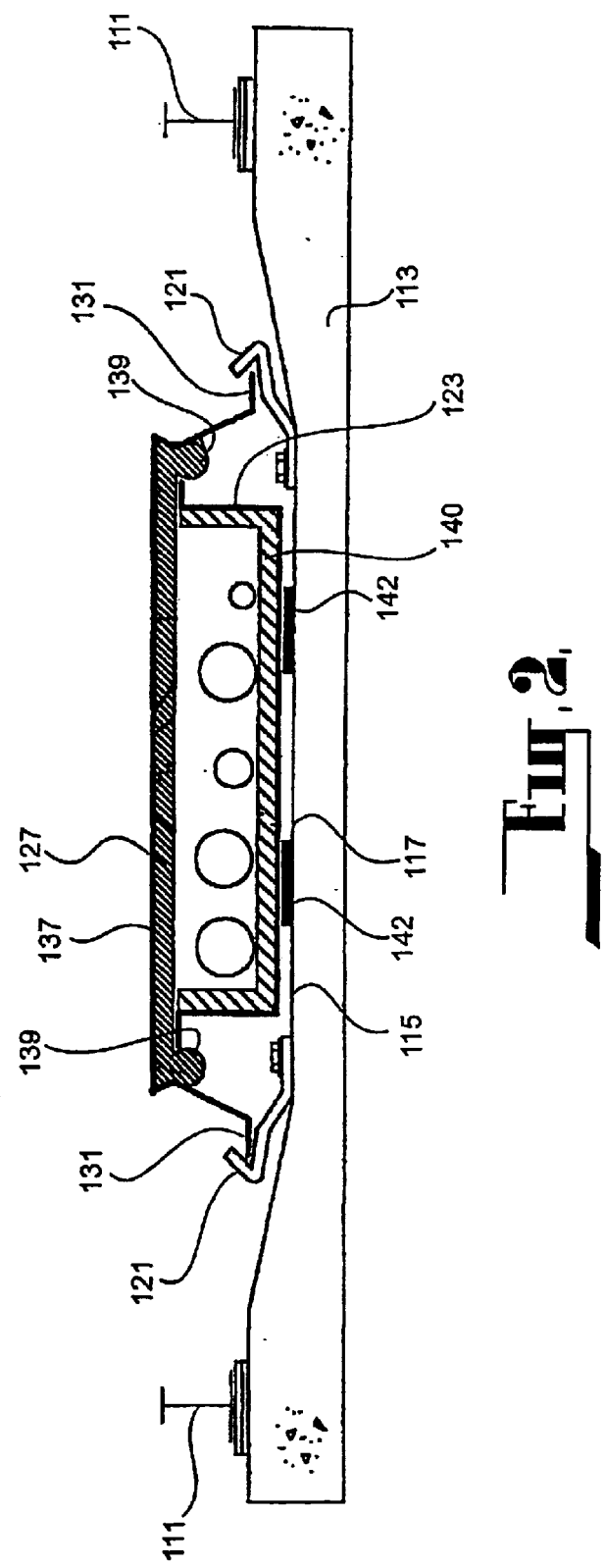
FIG. 2 is a schematic cross-sectional elevation of a second embodiment of the invention.

The second embodiment as shown at FIG. 2 is generally of a similar form to that of the first embodiment and comprises a rail track comprising a pair of parallel rails 111 supported upon a set of sleepers 113. The sleepers are each formed with a central recessed portion 115. In the case of the second embodiment the retention means comprises a pair of opposed retention members 121 which are fixed to the sleeper at either side of the recess 115. The support of the second embodiment comprises a tray 140 which extends along the length of the bed defined by the recesses 115 of the sleepers 113 of the rail track and which comprises a plurality of channel elements fixed in end to end relationship. The tray 140 is supported from the base 117 of the recess 115 by a resilient medium 142 which provides for some vibrational isolation between the sleeper 113 and the tray 140. The tray 140 comprises the support for the conductors or the like and is lined internally by a suitable medium 123 which provides both electrical insulation and some vibrational insulation. The cover 127 is of a similar form to that of first embodiment wherein the outer lips 131 are received in the retention members 121 to positively retain the cover 127 in position.

The internal face of the cover 127 is coated with a suitable thermal insulating material 137. The dimensions of the cover 127 are such that the thermal insulating material will engage the upper edges of the tray 140 to isolate the space accommodating the conductors and the like 25 from the remainder of the space defined between the cover 127 and the recess 115. The outer edges of the insulating material 137 provided on the internal face of the cover 127 are formed as ribs 139 which will sealingly and snugly engage the outer edges of the tray 140.

Figure 3:
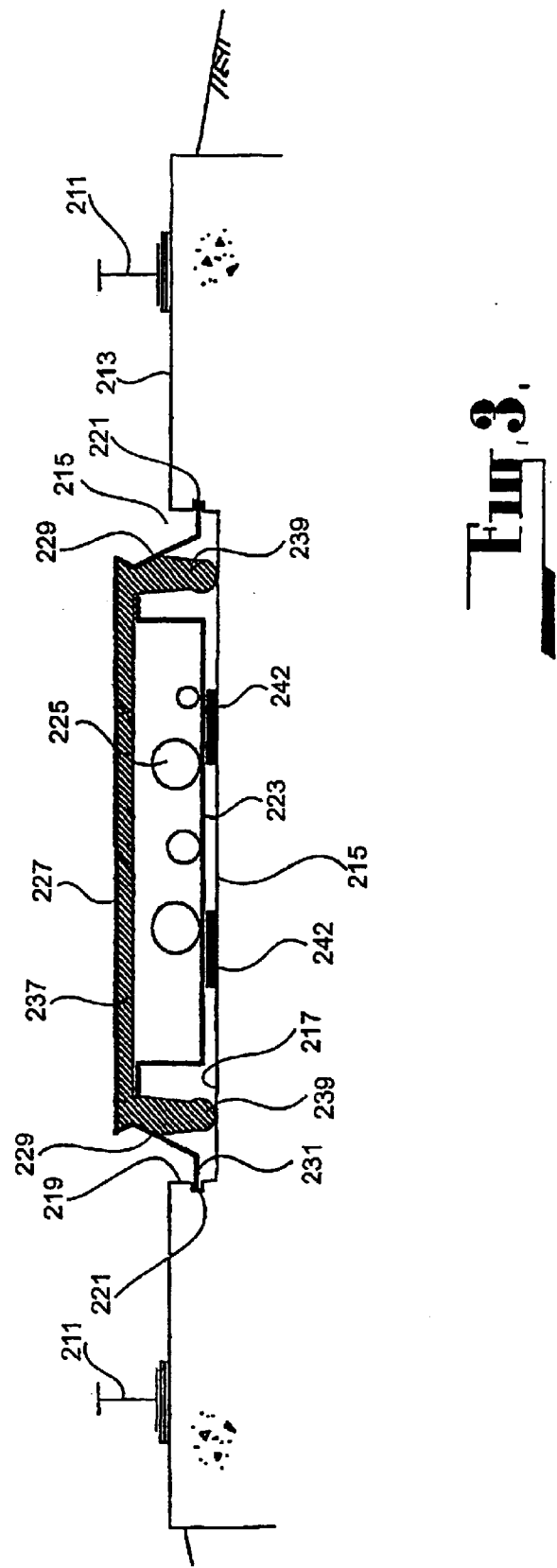
FIG. 3 is a schematic cross-sectional elevation of a third embodiment of the invention.

The third embodiment as illustrated at FIG. 3 comprises a rail track system which comprises a pair of rails 211 supported upon a set of preformed slabs 213 which are located in end-to-end relationship along the length of the rail track. The upper surface of the slabs 213 are formed with a recess 215 of similar form to the recess of the first embodiment which provides the bed. Lateral grooves 221 are provided at each side of the recess 215 and are intended to receive the lips 231 of a cover 227 of a similar form to that described in relation to the first embodiment. The recess 215 accommodates a support tray 240 of similar form to that of the second embodiment which accommodates the conductors 225 and the like in a similar manner and which cooperates with the cover 227 in a similar manner.

Figure 4:
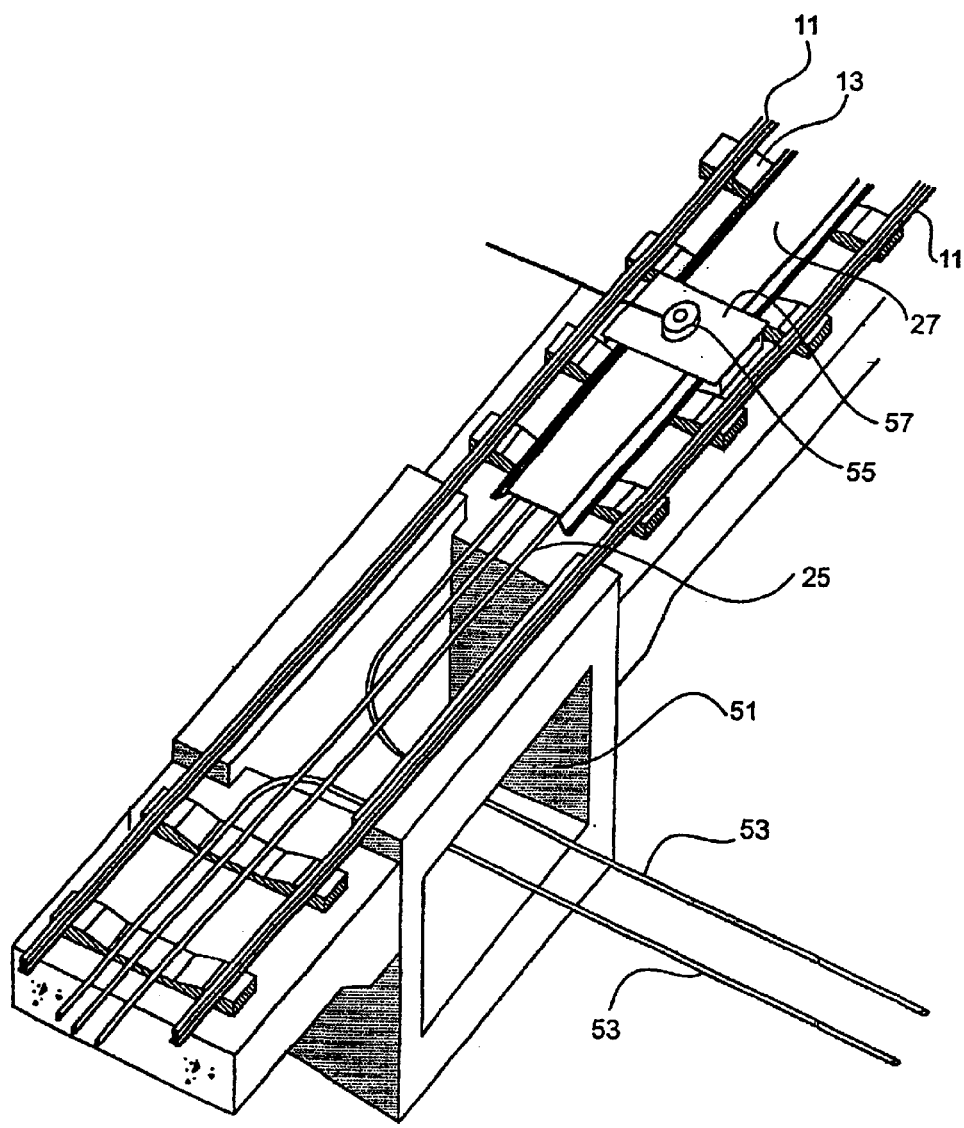
FIG. 4 is an illustration of a branching arrangement which can be utilised with each of the embodiments of FIGS. 1, 2 and 3.

FIG. 4 is an illustration of a branching arrangement which can be utilised with each of the embodiments described above. The purpose of the branching arrangement is to allow for the interconnection of the cables, conductors and the like with external users. The branching arrangement comprises a tunnel 51 which is provided underneath the rail track through which branching cables 52, 53 and pass to and from the duct provided in the rail track. In addition, FIG. 4 schematically illustrates the location of ancillary hardware 55 which is required for operation of the rail track. In this regard the hardware 55 can be supported upon support plates 57 which bridge the cover 27 whereby cables, pipes or the like 59 which are associated with the hardware 55 can pass laterally from the rail track.

Figure 5:
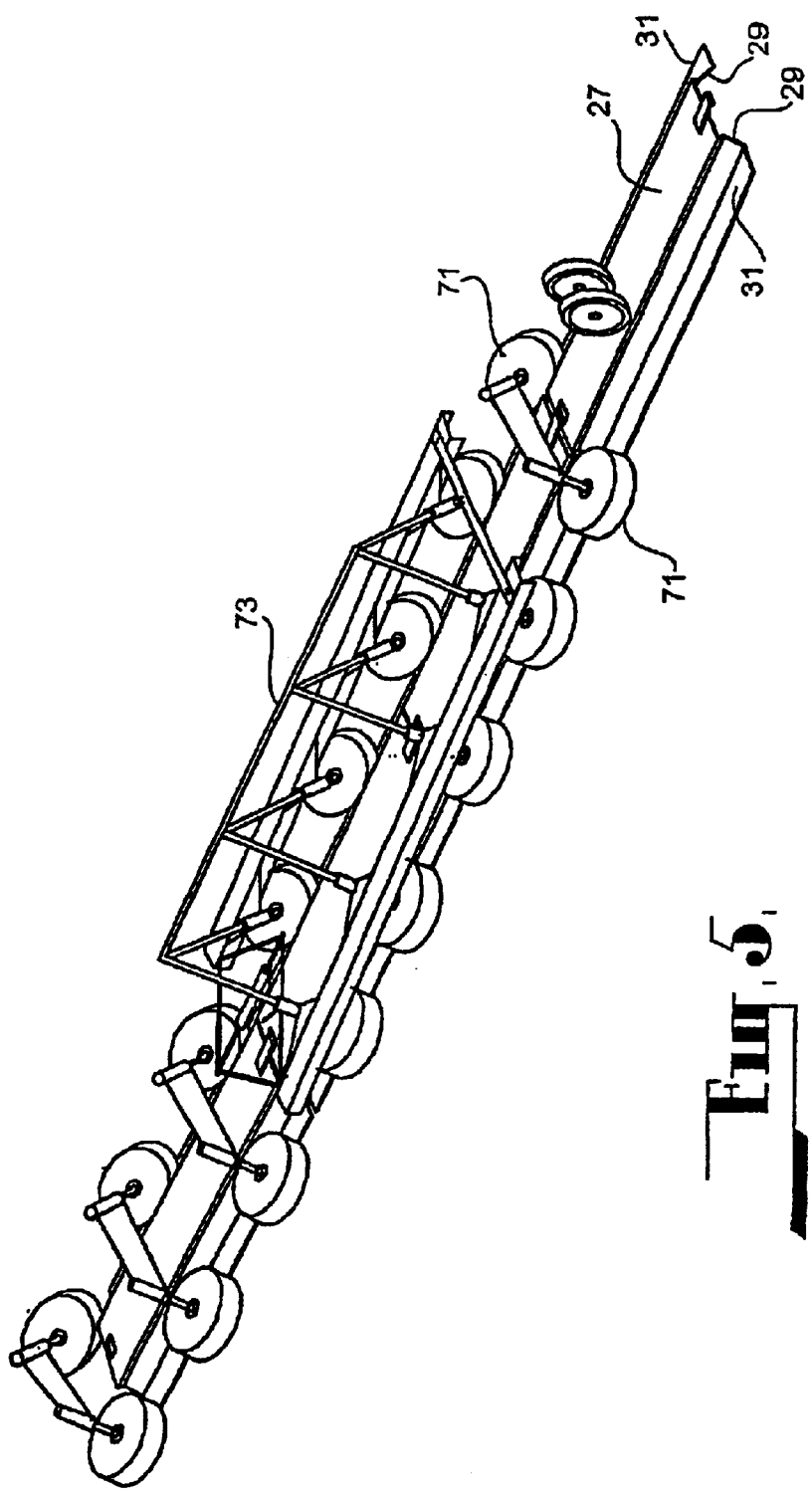
FIG. 5 is a schematic illustration of an apparatus which can be utilised for installation and withdrawal of the cover of each of the embodiments of FIGS. 1, 2, 3 and 6a to f.

FIG. 5 schematically illustrates apparatus which can be utilised for installation and retraction of the cover 27, 127 and 227 of each of the embodiments described above. Whilst the apparatus will be described in relation to installation removal of the cover plate 27 of the first embodiment, it has equal application to each of the other embodiments.

The apparatus comprises the clamping means for engaging the opposed flanges 29 of the cover 27 to cause inward resilient deformation of the flanges 29 to enable the lips 31 to be disengaged from the lateral grooves 21 of the recesses and subsequently raise the cover 27 from engagement with the recesses. The clamping means comprises a set of pairs of rollers 71 where the pairs of rollers are longitudinally spaced from each other. The rollers 71 of each pair are transversely spaced such that they are capable of being located to either side of the cover 27 to engage the opposed flanges 29 outward of the line of discontinuity provided in the flanges. A compression means (not shown) is provided between each pair of rollers whereby with movement of the rollers of each pair towards each other under the influence of the compression means, the flanges 29 are resiliently compressed. The clamping means is supported from a carriage 73 which is in turn supported from the rails of the rail track to be capable of movement along the rail track. In addition a lifting means is provided between one end of the clamping means and the carriage 73 to enable the one end to be raised and lowered relative to the other end.

The arrangement is such that the set of rollers will engage the cover plate and cause compression of the flanges 29 of the cover plate. Once the flanges 29 having been compressed the length of cover plate can then be raised out of position from the bed to be removed to permit servicing of the duct.

It will be appreciated that the installation of the cover over the bed will comprise a reverse process to the removal action described above.

According to a second embodiment of the apparatus of embodiment the contraction of the rollers of the clamping means is graduated along the length of the clamping means such that the cover when initially engaged by the rollers at the other end of the clamping means is partially compressed and the degree of compression increased until at the one end of the clamping means the cover has been fully compressed such that the lips 31 can be removed from the retention means. In addition the carriage 73 is driven to be movable along the track whereby the other end of the clamping means is the leading end. As a result the apparatus can be used to continuously move along the rail track to remove the cover from the bed whereby each length of channel once removed from the bed can be positioned clear of the track.

According to a further embodiment the apparatus for servicing the cover may comprise a single set of apparatus which is able to remove the cover from the bed and subsequently replace the cover in position over the bed. The apparatus comprises a duplication of the previous embodiment to provide a pair of clamping apparatus supported from a single carriage where the other end of the pair of clamping apparatus are in opposed relationship. As a result the apparatus can be used to lift the cover from the bed in a continuous action as the carriage is caused to move along the rail track and which will expose the bed to enable the servicing of the ducting (eg by introduction of a fresh conductor and the like or replacement or removal of an existing conductor and the like) and the subsequent reinstallation of the cover in position over the bed.

Figure 6:
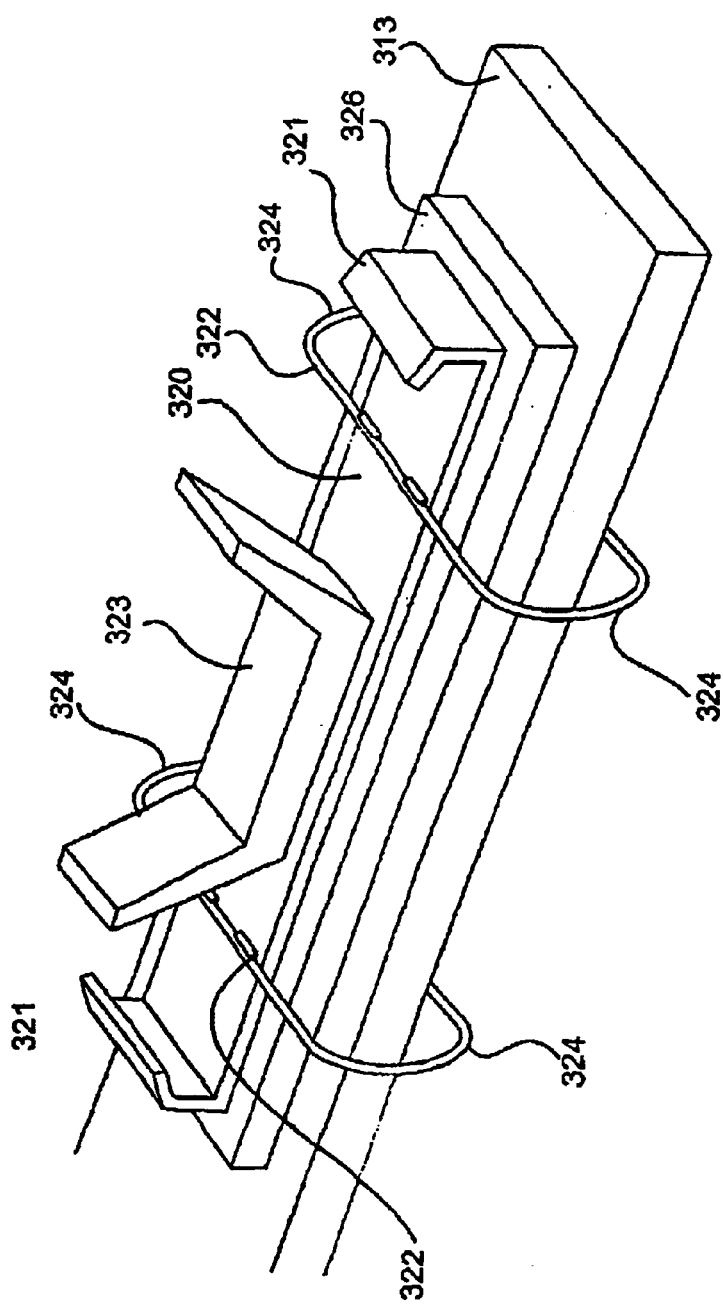
FIG. 6 is an isometric view of a retention means and support according to a fourth embodiment of the invention.
Figure 7:
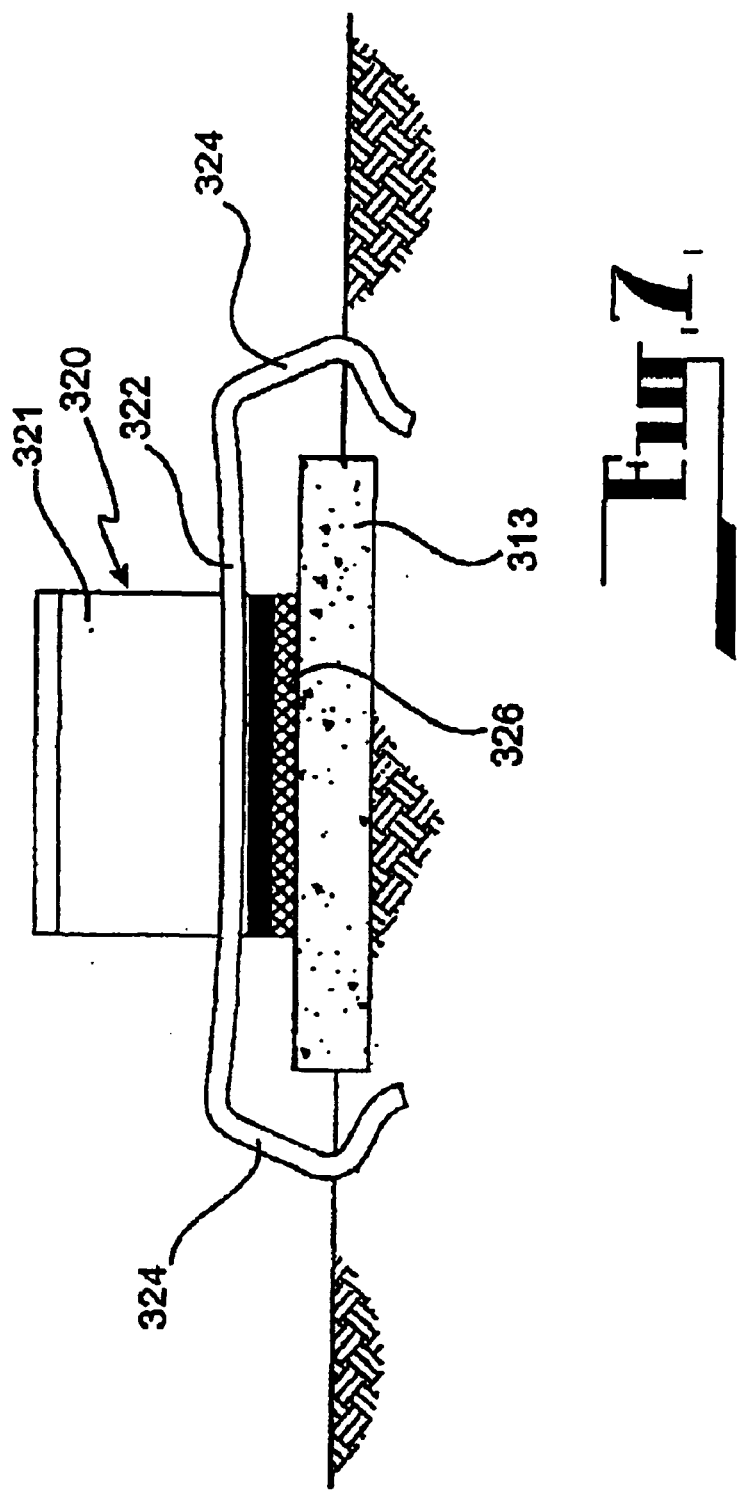
FIG. 7 is a cross-sectional view of a retention means and support according to a fifth embodiment of the invention.
Figure 8:
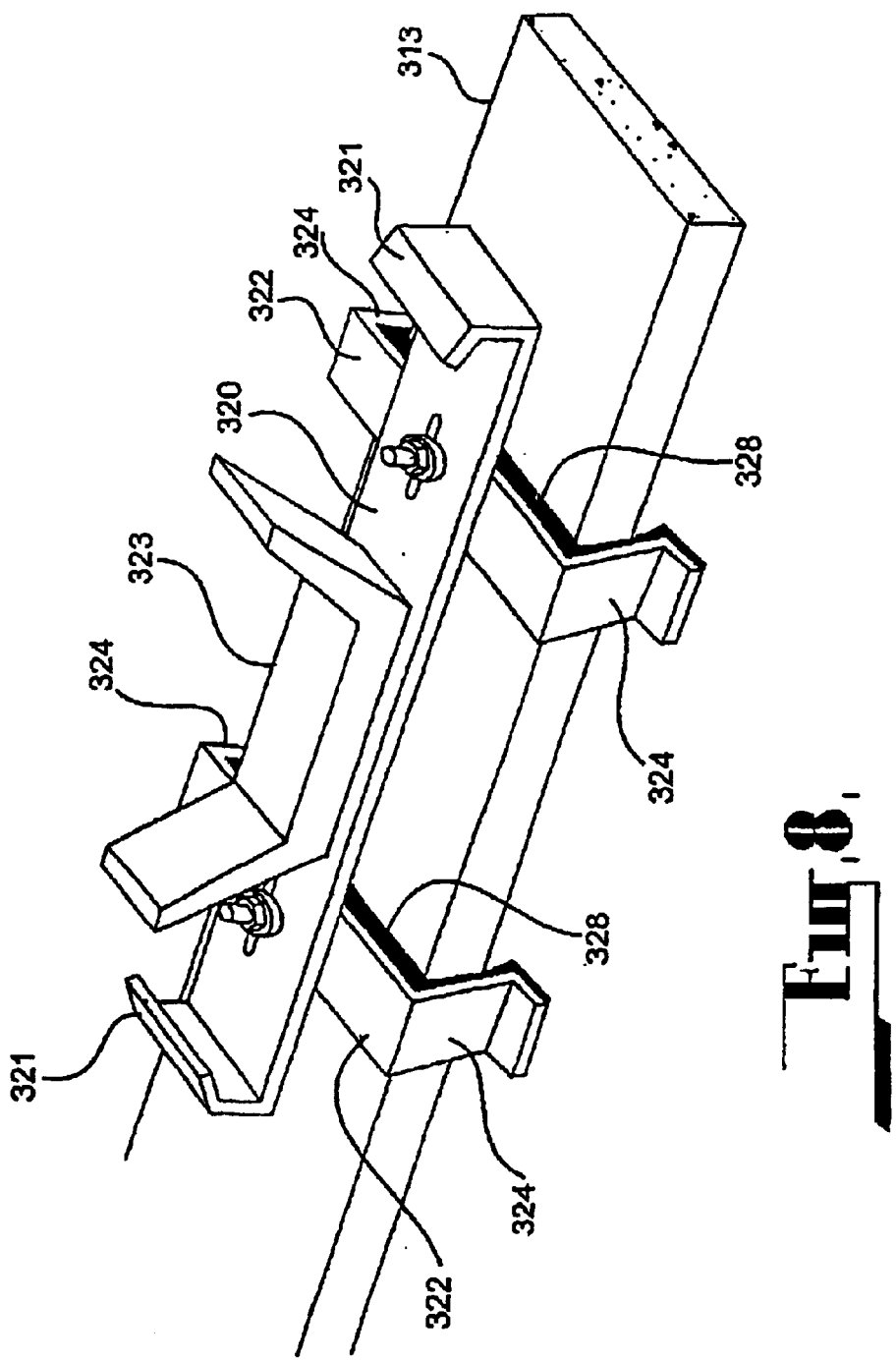
FIG. 8 is an isometric view of a retention means and support according to a sixth embodiment of the invention.

The fourth, fifth and sixth embodiments of the invention as shown at FIGS. 6, 7 and 8 each comprise an arrangement which is a variation of the second embodiment where the retention means 320 comprises a single member which incorporates each of the retention members 321 which are located in opposed relation to each other at each end of a central strip shaped web element. In each case the retention means is fixed to the sleeper 313 by a pair of clip members 322 which are in each case configured to straddle the sleeper and are formed with a pair of resilient legs 324 which are configured such that they must be resiliently deformed to be received over the sleeper.

In the case of the fourth and fifth embodiment of the invention a shown at FIGS. 6 and 7 where the central portion of each clip member is configured to engage the upper face of the central strip shaped web element of the retention member 320 and hold it in place. In the case of the sixth embodiment the central strip shaped web element of the retention member 320 is bolted to the clip members.

In the case of the fourth and fifth embodiments as shown at FIGS. 6 and 7 the clamping engagement between the clip members 322 and the retention means 320 is enhanced by use of a resilient compressible sheet element 326 which is located between the retention member 320 and the sleeper 313 and which is compressed by the application of the clip members to the sleeper.

In the case of the sixth embodiment the underneath of the clip member 322 is lined by a layer 328 of a resiliently compressible material such as a suitable elastomer or like material.

In each of the fourth fifth and sixth embodiments the retention means supports a support 340 in the form of a cradle formed of a suitable material which provides for electrical and some vibrational insulation to the cables which extend along the track over the spaced cradles located above each of the sleepers of the track.

Figure 9:
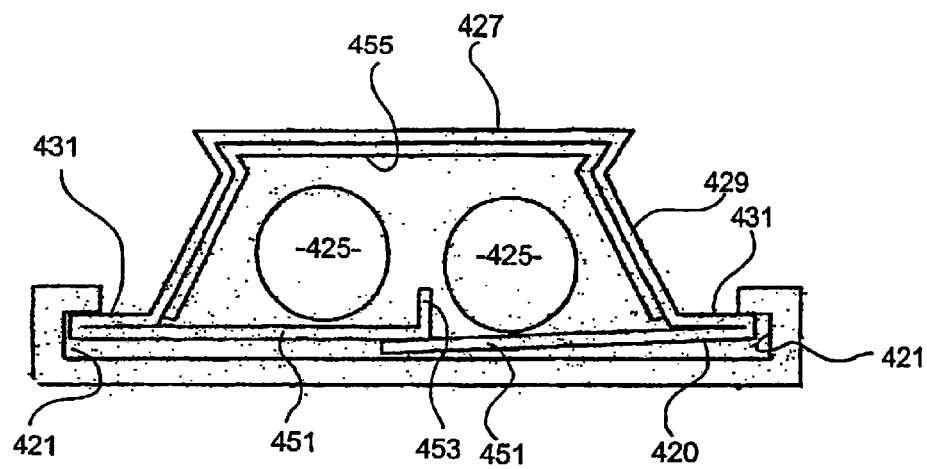
FIG. 9 is a cross-section of a seventh embodiment of the invention.

The use of the fourth, fifth and sixth embodiments of the invention as shown at FIGS. 6, 7 and 8 facilitates the application of ducting according to the invention to an existing railway track. In addition the use of the resilient clip members enables the ducting to accommodate for movements of the track with out significantly imposing any adverse forces upon the track FIG. 9 illustrates a the seventh embodiment of the invention where the lower edge of each flange 429 of the cover 427 is formed with an inwardly directed extension 451. The extensions overlap at their innermost extent and the extension which lies innermost is formed with an upwardly directed lip 453. The inner surface of each of the extensions provide a support surface for the conductors 425 the cover of the embodiment is formed from sheet metal and the extensions comprise folded formations at the edges of the flanges which form both the lips 431 as well as the extensions. In addition the material of which the cover is formed permits some resilient deformation of the cover to facilitate its engagement with the recesses of the retention means and resilient deformation of the extensions to enable conductors 425 to be introduced into the duct defined by the cover or removed from the duct by separation of the overlapping edges of the extensions. In addition connectors 455 are used to interconnect the abutting ends of adjacent lengths of cover. The connectors 425 have a an external profile which is complementary to at least a portion of the inner profile of the cover to enable them to be snugly received within the cover and have a length such that they extend for a short distance along the adjacent lengths of cover.

Figure 10:
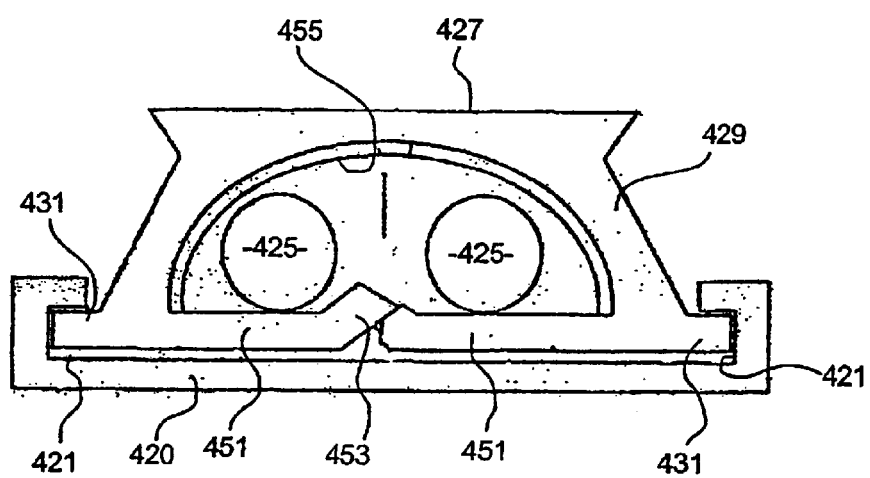
FIG. 10 is a cross-section of an eighth embodiment of the invention.

The eighth embodiment as shown at FIG. 10 is of a generally similar form to that of the seventh embodiment with the exception that the cover is formed of a suitable plastics or elastomeric material and has a geometry to accommodate for the material of which it is formed. As a result the same reference numerals which are used in FIG. 9 are used in FIG. 10 for corresponding elements.

Figure 11:
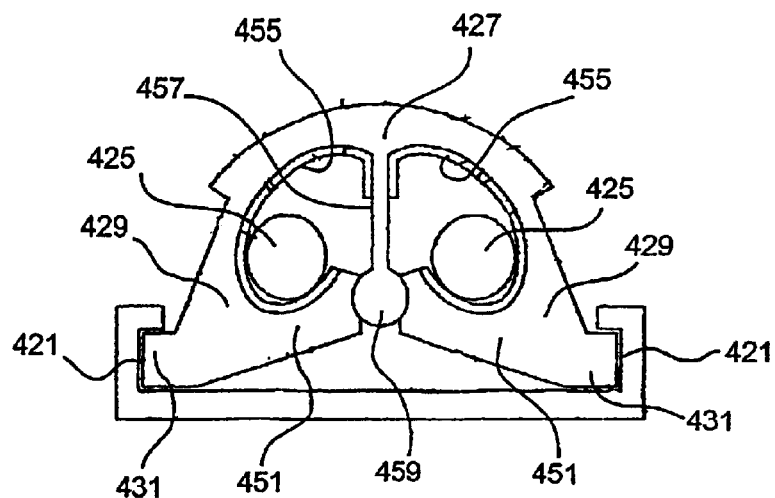
FIG. 11 is a cross-section of a ninth embodiment of the invention.

The ninth embodiment as shown at FIG. 11 is of a generally similar form to that of the eighth embodiment and has a cover which is also formed of a suitable plastics or elastomeric material and has a geometry to accommodate for the material of which it is formed. As a result the same reference numerals which are used in. FIGS. 9 and 10 are used in FIG. 11 for corresponding elements. In the case of the ninth embodiment the extensions 451 do not overlap but are associated with a partition 457 which is formed to extend across the interior of the cover to terminate with an enlarged rib 459 which is located between the opposed edges of the extensions 451 to define separate ducts within the cover which can be accessed with resilient deformation of the extensions 451.

Figure 12:
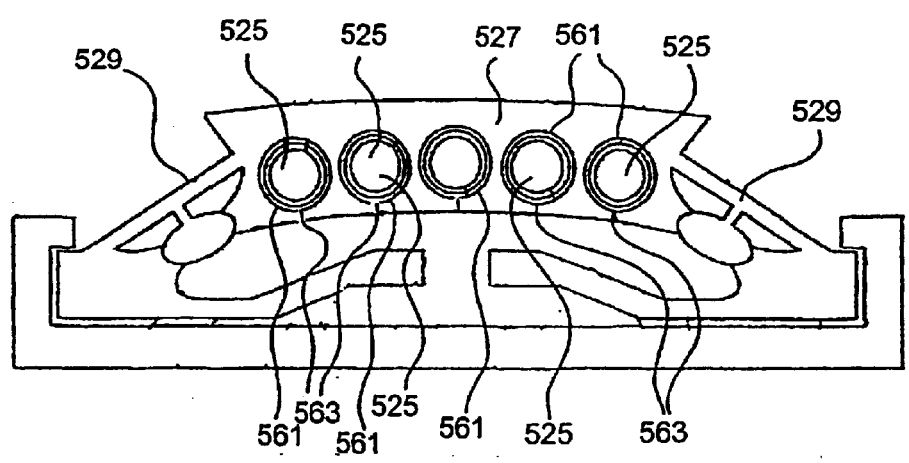
FIG. 12 is a cross-section of a tenth embodiment of the invention.

The tenth embodiment of the invention as shown at FIG. 12 utilises a cover which is also formed of a suitable plastics or elastomeric material and has a geometry to accommodate for the material of which it is formed. In the case of the tenth embodiment the inner face of web of the cover 527 between the flanges 529 is formed with a set of ducts 561 which are located in side by side relationship across the web and which are each intended to accommodate a conductor 525. Each duct is formed with a slit 563 which extends for the length of the cover and which provides the entry to the duct to enable a conductor to be inserted into the duct or extracted from the duct.

Figure 13:
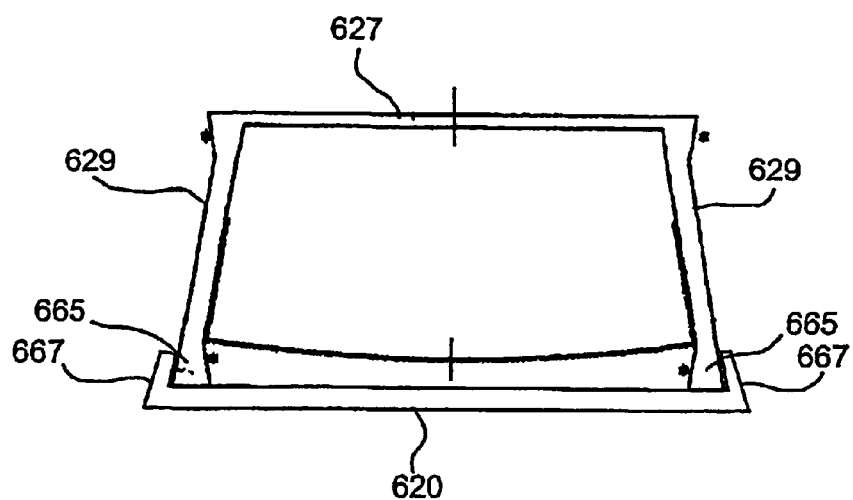
FIG. 13 is a cross-section of a cover according to the eleventh embodiment of the invention.

The eleventh embodiment of the invention as shown at FIG. 13 utilises a cover 627 having the configuration of a channel in which the flanges 629 are divergent but are not provided with lips at their edges 665 as has been the case with previous embodiments and which is also formed of a suitable resilient material. In use the edges 665 of the flanges are received between opposed lips 667 provided on the retention means 620.

Figure 14A:
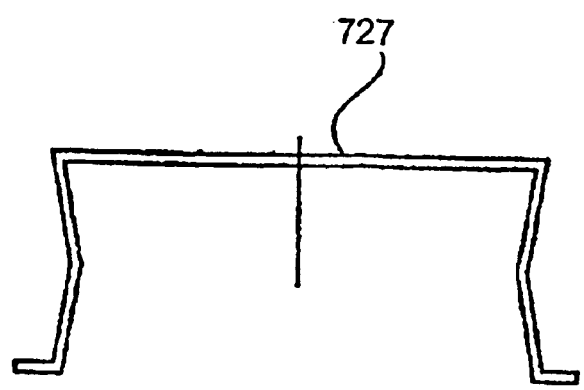
FIGS. 14a and 14b is a cross-section of a cover according to the twelfth embodiment and an insert which is receivable in the cover respectively.
Figure 14B:
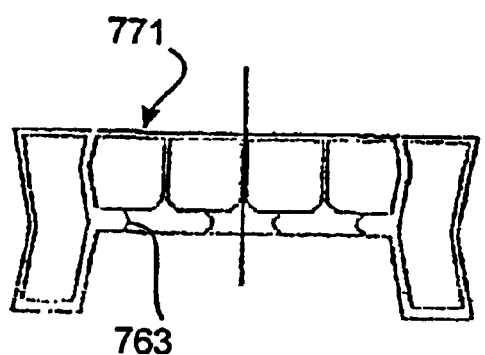

The twelfth embodiment of the invention as shown at FIGS. 14 and 14b is of a similar form to that of the tenth embodiment as shown at FIG. 12 with the exception that it is formed as a 2-part element comprising a cover 727 as shown at FIG. 14a which is of a generally similar form to the cover of the first embodiment and is formed of a suitable sheet metal and which is associated with an insert 771 which is formed of a suitable plastics or elastomeric material which is snugly receivable within the cover and which provides a plurality of ducts 761 for accommodating conductors which can be inserted into the ducts through slits 763

Figure 15:
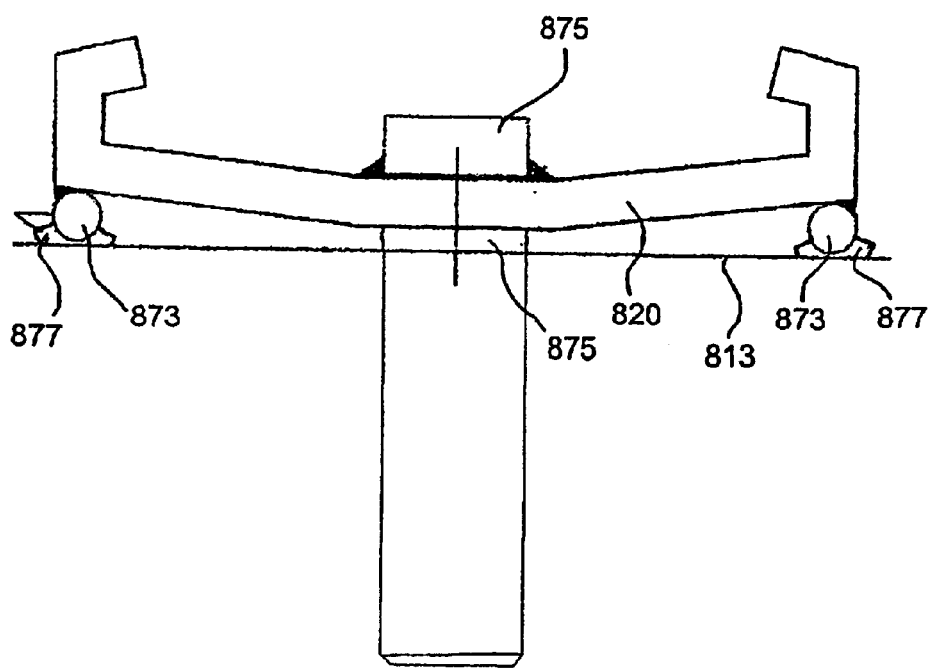
FIG. 15 is a side elevation of a retention means according to the thirteenth embodiment of the invention.

FIG. 15 illustrates a retention means 820 according to the thirteenth embodiment of the invention. The retention means of the thirteenth embodiment is a variation of the fourth, fifth and sixth embodiments of the invention as shown at FIGS. 6, 7 and 8. In the case of the thirteenth embodiment the compressible sheet material is no longer present. Instead the retention means is supported at each end by a rib 873 provided on the under surface of the retention means which is in turn supported from the bed 813 and as a result the central portion of the retention means is spaced above the bed 813. The retention means is fixed at its central portion to the bed by a suitable fixing 875 which serves to place the retention means in a state of tension on the fixing means being tightened. In addition the ribs 873 are supported from the bed 813 through a resiliently compressible material 877 which is located between the rib and the bed prior to application of the fixing means.

FIGS. 16a to f illustrate various alternative embodiments of the invention illustrating various relationships between the cover 927, retention means 920 and support 923 for the conductors or the like in which the reference lines A and B illustrate the position of the flanges when engaged with the retention means 920 and when compressed respectively.

Figure 17A:
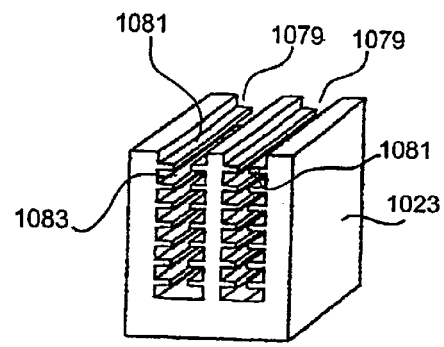
FIGS. 17a and 17b are alternative forms of the cradle which can be used with the various embodiments in supporting the conductors.
Figure 17B:
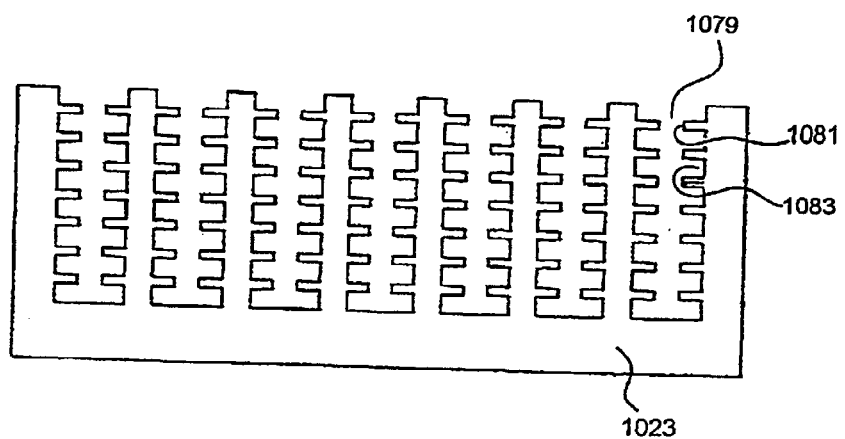

FIGS. 17a and 17b illustrate two forms of support 1023 which can be used with each of the embodiments and which provide a number of laterally spaced recesses 1079 which can each be used to accommodate a plurality of conductors (not shown). Each recess 1079 is formed with a set opposed ribs 1081 which each define a space 1083 for accommodating a single conductor which is of an oval or ellipsoidal configuration where the spacing between the outer edges of the ribs 1081 corresponds to the minor dimension of the conductor and the spacing between the base of each space corresponds substantially with the major dimension of the conductor.

Each of the embodiments provide a means for providing ducting in association with a rail track whereby the ducting is capable of being installed and regularly serviced for the introduction of additional cables or repair to existing cable without adverse influence to the railway service being associated with the rail track. In addition each of the embodiments provide a ducting in which the increasing demands for additional conductors and the like can be accommodated without undue disruption to existing infrastructure.

Throughout the specification, unless the context requires otherwise, the word "comprise" or variations such as "comprises" or "comprising", will be understood to imply the inclusion of a stated integer or group of integers but not the exclusion of any other integer or group of integers.

It should be appreciated that the scope of the present invention need not be limited to the particular scope of the embodiments described above.

The claims defining the invention are as follows:

1. Ducting on a railroad rail track, comprising a pair of parallel rails supported from a base, the base providing a bed proximate the rails and co-extensive with the rail track, a cover receivable over the bed comprising a plurality of elongate channel members located in end to end relationship having their flanges extending downwardly, said cover being mounted on the bed and defining a duct accommodating at least one of a conductor, cable and conduit, retention means mounted on the bed and adapted to receive and retain the edges of the channel members, said edges being selectively engagable and/or disengageable with the retention means by application of opposed and inwardly directed forces to the edges to cause resilient inward displacement of the edges from the retention means.

2. Ducting as claimed at claim 1 wherein adjacent lengths of said channel members are interconnected by sleeves which extend between the abutting ends of adjacent channel members.

3. Ducting as claimed at claims 2 wherein the edges of the channel members are at least partially retained by the retention means by a resilient deformation induced by engagement with the retention means.

4. Ducting as claimed at claims 1 wherein the dusting further comprises a support for said at least one of a conductor, cable and conduit which extends along the length of the bed.

5. Ducting as claimed at claim 4 wherein the support provides electrical insulation.

6. Ducting as claimed at claim 5 wherein the support provides at least some vibrational insulation.

7. Ducting as claimed at claim 6 wherein the support is supported from the bed.

8. Ducting as claimed at claim 7 wherein the support comprises a plurality of cradles located at spaced intervals along the bed, said cradles having a recessed upper surface which is adapted to accommodate said at least one of a conductor, cable and conduit.

9. Ducting as claimed at claim 8 wherein the rail track incorporates sleepers which support the rails and which are located at regular spaced intervals along the length of track, said bed being defined in part by a transverse zone of the upper surface of the sleepers and wherein the transverse zone accommodates the support.

10. Ducting as claimed at claim 9 wherein the transverse zone of the sleepers is recessed.

11. Ducting as claimed at claim 7 wherein, the support comprises a tray extending along the bed and defined by a plurality of interconnected elongate, upwardly directed channel members supported in end-to-end relationship.

12. Ducting as claimed at claim 11 wherein the flanges provided on the tray comprise the retention means.

13. Ducting as claimed at claim 12 wherein the flanges provided by the tray are inclined to be convergent towards each other, said flanges being adapted to receive between themselves the edges of the cover.

14. Ducting as claimed at claim 11 wherein the base of each of the tray accommodates an elongate support element adapted to receive the conductors and the like.

15. Ducting as claimed at claim 11 wherein, at least some of the conductors or the like are embedded within the support.

16. Ducting as claimed at claim 14 wherein, the surface of the support element is of a recessed cross-sectional profile.

17. Ducting as claimed at claim 16 wherein the recesses provided in the support element are adapted to support the conductors in a one to one relationship.

18. Ducting as claimed at claim 17 wherein the recesses are spaced vertically with respect to each other.

19. Ducting as claimed at claim 4 wherein the support is associated with a closure which is intended to be received over the support to isolate the conductors or the like from the remainder of the duct.

20. Ducting as claimed at claim 19 wherein, the cover is adapted to cooperate with the support to enclose the conductors and the like accommodated by the support.

21. Ducting as claimed at claim 4 wherein the support is supported from the cover and is formed with at least one recess which is adapted to support the conductor.

22. Ducting as claimed at claim 21 wherein the support and cover are integral and the recess is formed on the inner face of the cover.

23. Ducting as claimed at claim 21 wherein the recess is substantially closed and is provided with an entry which is normally closed and can be opened on deformation of the support.

24. Ducting as claimed at claim 1 wherein the retention means comprises a pair of retention members supported from the bed at spaced intervals there along, the retention members of each pair being spaced to either side of the bed, the edges of the cover being received between the retention members.

25. Ducting as claimed at claim 8 wherein the rail track incorporates sleepers which support the rails and which are located at regular spaced intervals along the length of track, said bed being defined in part by a transverse zone of the upper surface of the sleepers and wherein the sleeper is formed with a channel-shaped depression extending transversely across the upper surface of the sleeper, said retention members being incorporated to either side of the depression.

26. Ducting as claimed claim 24 wherein, the retention means comprises an elongate member adapted to be fixed to the bed to extend across the bed, each end of the elongate member provided with said retention members.

27. Ducting as claimed at claim 26 wherein the retention means is fixed by at least one clip member which is clampingly engaged with the sleeper.

28. Ducting as claimed at claim 27 wherein at least two clip members fix the retention means to the sleeper.

29. Ducting as claimed at claim 1 wherein the flanges of the cover are inclined divergently with respect to each other.

30. Ducting as claimed at claim 1 wherein the outer edge of each of the flanges of the cover is provided with a laterally extending lip which in use is to be retained between the retention members of the retention means and against the upper surface of the bed.

31. Ducting as claimed at claim 30 wherein the lips are directed outwardly from the cover.

32. Ducting as claimed at claim 28 wherein the lips are directed inwardly from the cover.

33. Ducting as claimed at claim 1 wherein the junction of the flanges of the cover with the remainder of the cover is adapted to enable resilient flexing of the flanges as a result of said resilient deformation.

34. Ducting as claimed at claim 1 wherein at least one of the flanges of the cover is formed with an inwardly directed extension which provides a support surface for the conductors.

35. Ducting as claimed at claim 34 wherein the extension is provided on each of the flanges.

36. Ducting as claimed at claim 35 wherein the extensions overlap, said extensions being resiliently deformable to enable separation between the overlapping portions.

37. Ducting as claimed at claim 35 wherein the inner face of the cover is provided with a partition which subdivides the space defined within the cover by the extensions into separate spaces.

38. Ducting as claimed at claim 37 wherein the free edges of the extensions abut with the partition and the extensions are capable of resilient deformation to separate their edges from the partition.

39. Ducting as claimed at claim 1 wherein the bed is located between the rails.

40. Ducting as claimed at claim 39 wherein the bed is located beside one of the rails.

41. Ducting as claimed at claim 1 wherein the bed is located beside one of the rails and to the side of the rail remote from the other rail.

42. Ducting as claimed at claim 11 wherein the support is associated with a closure which is intended to be received over the support to isolate said at least one of a conductor, cable and conduit from the remainder of the duct.

43. Ducting as claimed at claim 42 wherein, the cover is adapted to cooperate with the support to enclose said at least one of a conductor, cable and conduit accommodated by the support.

44. Ducting as claimed at claim 42 wherein at least one of the flanges of the cover is formed with an inwardly directed extension which provides a support surface for said at least one of a conductor, cable and conduit.

45. Ducting as claimed at claim 44 wherein the extension is provided on each of the flanges.

46. Ducting as claimed at claim 45 wherein the extensions overlap, said extensions being resiliently deformable to enable separation between the overlapping portions.

47. Ducting as claimed at claim 45 wherein the inner face of the cover is provided with a partition which subdivides the space defined within the cover by the extensions into separate spaces.

48. Ducting as claimed at claim 47 wherein the free edges of the extensions abut with the partition and the extensions are capable of resilient deformation to separate their edges from the partition.

49. Ducting as claimed at claim 43 wherein at least one of the flanges of the cover is formed with an inwardly directed extension which provides a support surface for said at least one of a conductor, cable and conduit.

50. Ducting as claimed at claim 49 wherein the extension is provided on each of the flanges.

51. Ducting as claimed at claim 50 wherein the extensions overlap, said extensions being resiliently deformable to enable separation between the overlapping portions.

52. Ducting as claimed at claim 50 wherein the inner face of the cover is provided with a partition which subdivides the space defined within the cover by the extensions into separate spaces.

53. Ducting as claimed at claim 52 wherein the free edges of the extensions abut with the partition and the extensions are capable of resilient deformation to separate their edges from the partition.

54. Ducting as claimed in claim 1, wherein said duct is capable of accommodating at least one of a conductor, cable and conduit.

* * * * *